United States Patent
Minato et al.

(10) Patent No.: US 9,162,529 B2
(45) Date of Patent: Oct. 20, 2015

(54) CASTER

(71) Applicant: INERTIA ENGINEERING + DESIGN INC., Toronto (CA)

(72) Inventors: Raymond J. Minato, Toronto (CA); Eleu Thereus Tai-Sung Um, Toronto (CA); Christopher R. Leiphart, Toronto (CA)

(73) Assignee: Inertia Engineering + Design Inc., Toronto, Ontario (CA)

( * ) Notice: Subject to any disclaimer, the term of this patent is extended or adjusted under 35 U.S.C. 154(b) by 0 days.

(21) Appl. No.: 14/529,706

(22) Filed: Oct. 31, 2014

(65) Prior Publication Data
US 2015/0121652 A1 May 7, 2015

Related U.S. Application Data

(60) Provisional application No. 61/901,113, filed on Nov. 7, 2013.

(51) Int. Cl.
*B60B 33/00* (2006.01)

(52) U.S. Cl.
CPC ......... *B60B 33/0028* (2013.01); *B60B 2200/22* (2013.01); *B60B 2900/5112* (2013.01); *Y10T 16/1847* (2015.01)

(58) Field of Classification Search
CPC ... Y10T 16/18; Y10T 16/184; Y10T 16/1847; Y10T 16/1857; Y10T 16/199; Y10T 16/201–16/204; Y10T 16/216; A61G 5/10; B60B 33/0002; B60B 33/0028; B60B 33/0039; B60B 33/0068; B60B 2200/22; B60B 2900/5112; B60B 27/00; B60B 27/0005; B60B 27/001; B60B 3/048; B60C 7/24; F16C 13/006

USPC ........ 16/18 R, 45, 46, 48, 37–39, 31 R, 31 A, 16/18 CG; 280/250.1
See application file for complete search history.

(56) References Cited

U.S. PATENT DOCUMENTS

| | | | |
|---|---|---|---|
| 1,004,481 A | 9/1911 | Seward | |
| 1,194,177 A | 8/1916 | Henderson | |
| 5,199,131 A | 4/1993 | Harris | |
| 5,303,449 A | 4/1994 | Gray | |
| 5,568,671 A | 10/1996 | Harris et al. | |
| 6,839,939 B2 | 1/2005 | Donakowski | |
| 7,150,070 B2 | 12/2006 | Donakowski | |
| 7,334,617 B2 | 2/2008 | Hill, III et al. | |
| 7,657,969 B2 | 2/2010 | Trivini | |
| 8,375,515 B2 | 2/2013 | Hozumi et al. | |
| 2011/0221162 A1* | 9/2011 | Ludovici et al. | 280/250.1 |

* cited by examiner

*Primary Examiner* — William Miller
(74) *Attorney, Agent, or Firm* — Millman IP Inc.

(57) ABSTRACT

A lightweight caster is described that is resistant to ingress of debris into a caster bearing. The caster has a monolithic fork having an annular wheel-supporting portion and a chair-supporting portion. The wheel-supporting portion has a pass-through aperture for receiving a retainer. A rotational bearing is supported on the wheel-supporting portion, which supports a wheel rim such that the wheel rotates in the vertical plane. The rim has a pass-through aperture aligned with the pass-through aperture of the fork, and a ring at an inside edge of the bearing to retain the bearing between the rim and the fork and to inhibit debris from contacting the bearing. A retainer retains the rim on the fork and has an aperture aligned with the fork pass-through aperture. The retainer also has a bearing-retaining portion at an outside edge of the bearing to retain the bearing and to inhibit debris from migrating inwardly.

14 Claims, 4 Drawing Sheets

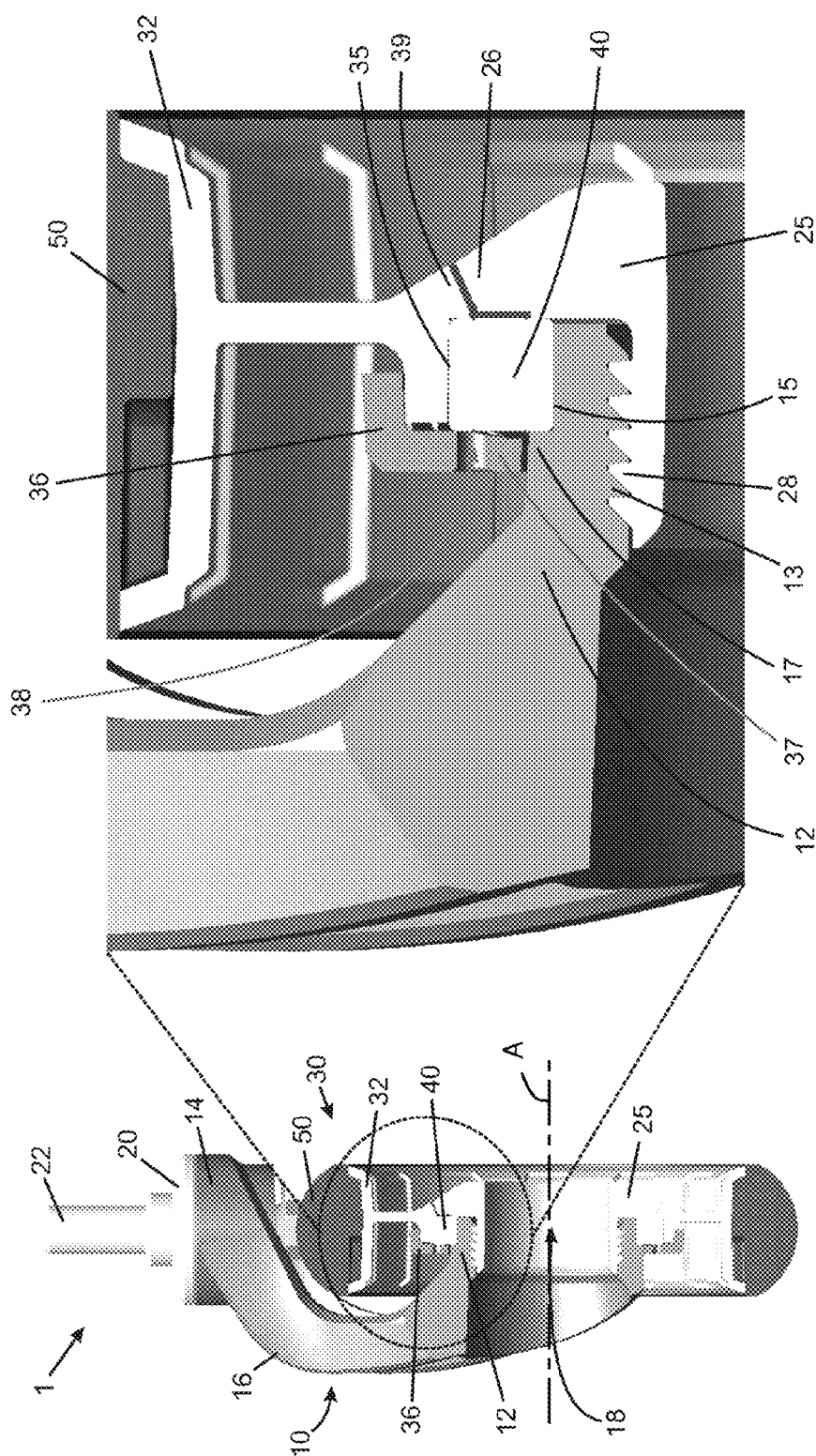

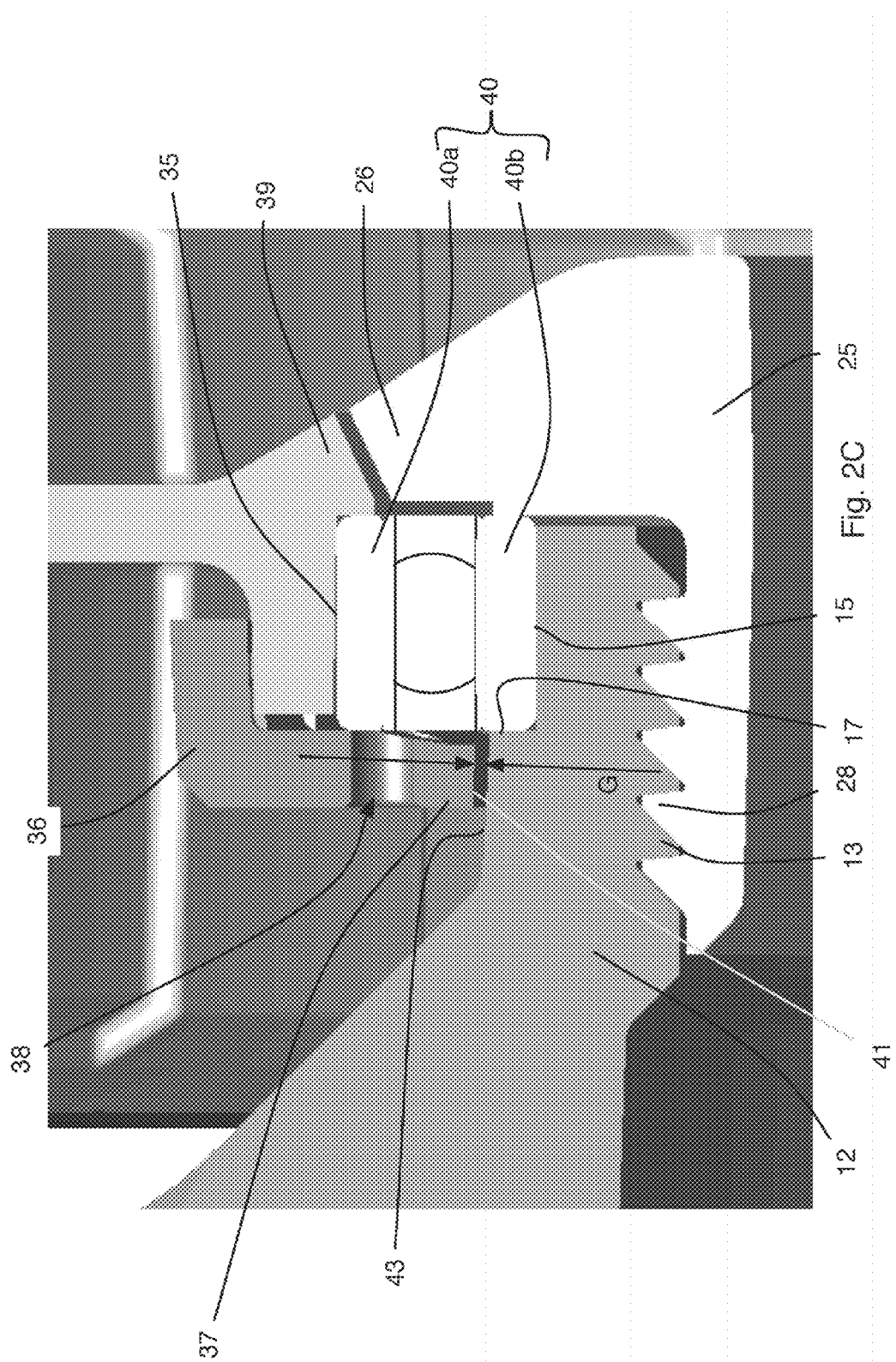

CASTER

CROSS-REFERENCE TO RELATED APPLICATIONS

This application claims the benefit of U.S. Provisional Application No. 61/901,113, filed Nov. 7, 2013, the contents of which are incorporated herein by reference in their entirety.

FIELD

This application relates to casters for chairs and the like, and particularly for wheel chairs.

BACKGROUND

A caster generally comprises a rotational element, for example a wheel or a roller on an axle, and a mount for mounting the wheel to a chair. Casters are mounted on chairs, benches, tables and the like to permit movement of such items across a surface, for example the ground, without the need to lift the items. However, sometimes there is a need to lift the item, for example when lifting a wheelchair into a vehicle. Heavy casters cause a large torque on the wheelchair when lifted, which impacts ergonomics of activities such as getting the wheelchair into the vehicle.

Further, hair and thread and other debris picked up by a rotating tire may eventually drop down to wrap around elements of the caster, for example an axle. If not removed, the hair, threads, etc. may wind tightly around the axle and may penetrate the bearing seal. This allows corrosion of the bearing races, resulting in poor caster performance.

Thus, there is a need for lightweight casters that reduce the potential for debris to enter the bearing races.

SUMMARY

In one aspect, there is provided a caster comprising: a monolithic fork comprising a substantially annular wheel-supporting portion and a chair-supporting portion, the wheel-supporting portion having a pass-through aperture and at least a portion of an inner surface of the fork around the pass-through aperture configured to receive a retainer, a rotational bearing supported on the wheel-supporting portion of the fork; a wheel comprising a load-supporting rim, the rim supported on the bearing such that the wheel rotates on the bearing in the vertical plane, the rim comprising a pass-through aperture aligned with the pass-through aperture of the fork, the rim further comprising a non-load bearing substantially annular ring at an inside edge of the bearing to retain the bearing between the rim and the fork and to inhibit debris from contacting the bearing; and, a retainer configured to be received by the inner surface of the fork, the retainer comprising a pass-through aperture aligned with the pass-through aperture of the fork, the retainer further comprising a bearing-retaining portion at an outside edge of the bearing to retain the bearing between the rim and the fork and to inhibit debris from contacting the bearing.

In another aspect, there is provided a tire comprising an annular ring of polymeric (e.g. elastomeric) material having an outer surface and an inner surface, the inner surface comprising a plurality of raised portions. The tire may be used with the caster described herein.

In one embodiment, the rotational bearing is a single rotational bearing aligned in the vertical plane so that the bearing rotates in the vertical plane. Use of a single central bearing reduces weight.

In one embodiment, the annular ring may be welded to the rim, for example by ultrasonic welding. In another embodiment the annular ring may be monolithic with the rim so that the annular ring and rim are of a single piece of material.

The rim may further comprise an outer bearing stop portion at the outside edge of the bearing to retain the bearing between the rim and the fork. Where the rim comprises an outer bearing stop portion, the annular ring is preferably attached (e.g. welded) to the rim, rather than being a monolithic part of the rim. This facilitates construction since a caster with a rim having a monolithic annular ring at an inside edge of the bearing and an outer bearing stop portion at an outer edge of the bearing would be difficult to assemble as the bearing is located between the annular ring and outer bearing stop.

In one embodiment, the wheel-supporting portion of the fork may comprise an inner bearing stop portion at the inside edge of the bearing to retain the bearing between the rim and the fork.

In one embodiment, the fork may comprise an arcuately-shaped leg between the wheel-supporting portion and the chair-supporting portion.

In one embodiment, one or more of the fork, rim, annular ring and retainer may comprise a filled plastic material. It is evident that the fork, rim, annular ring and retainer may comprise any suitable material, for example metal or plastic (filled or unfilled), however, plastic materials are generally less dense than metals thereby reducing weight, and filled plastics are generally stronger than unfilled plastics. All of the fork, rim, annular ring and retainer may comprise the same material. Each may comprise the same or different material as one or more of the others. The fork, rim, annular ring and retainer may be conveniently formed by generally known techniques, for example die stamping, molding and the like.

In one embodiment, a pivot bearing and a pivot pin in the pivot bearing may be mounted on the chair-supporting portion of the fork. The pivot pin may be configured to be mounted on the chair. Other ways of mounting the caster to chairs are well known to those skilled in the art. The chair may be a wheelchair.

In one embodiment, the plurality of raised portions of the tire may comprise a raised annular ring around a circumference of the inner surface. In one embodiment, the material of the tire may comprise a natural or synthetic rubber.

In yet another aspect, there is provided a caster comprising a monolithic fork comprising a non-rotating hub having a generally cylindrical outer surface, a rotational bearing supported on an outer end of the hub, a wheel comprising a load-supporting rim supported on the bearing, and a blocking ring that mounts to the wheel and that has a radially inwardly extending portion that extends towards the hub. The hub has at least a selected diameter.

Further features will be described or will become apparent in the course of the following detailed description.

BRIEF DESCRIPTION OF THE DRAWINGS

For clearer understanding, preferred embodiments will now be described in detail by way of example, with reference to the accompanying drawings, in which:

FIG. 2A is a schematic end view of the caster of FIG. 1A showing a vertical section through a wheel and fork;

FIG. 2B is a magnified view of a region in FIG. 2A delineated by the stippled circle;

FIG. 2C is a highly magnified view of a portion of the region shown in FIG. 2B; and, FIG. 3 is a schematic of a tire useable in conjunction with the caster of FIG. 1A.

DETAILED DESCRIPTION

Figure 1A:
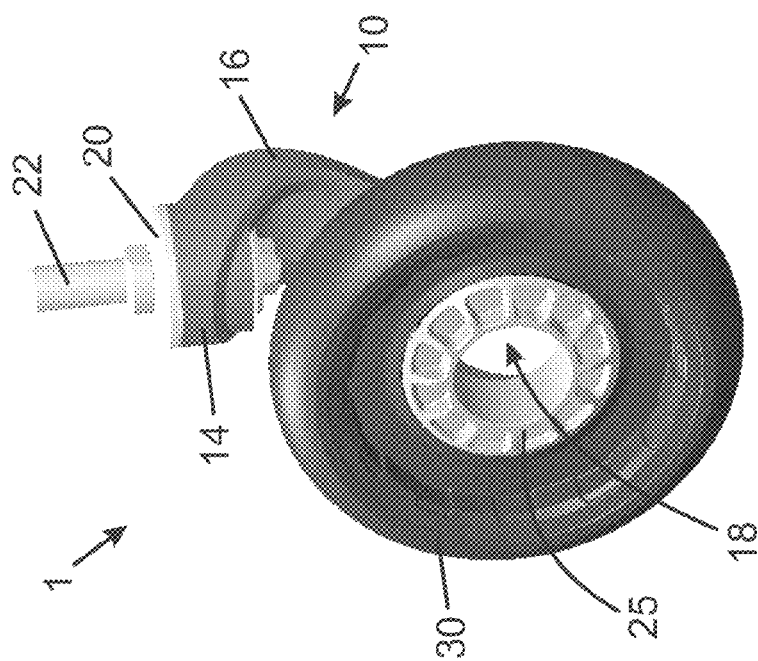
FIG. 1A is a schematic back side perspective view of a caster.
Figure 1B:
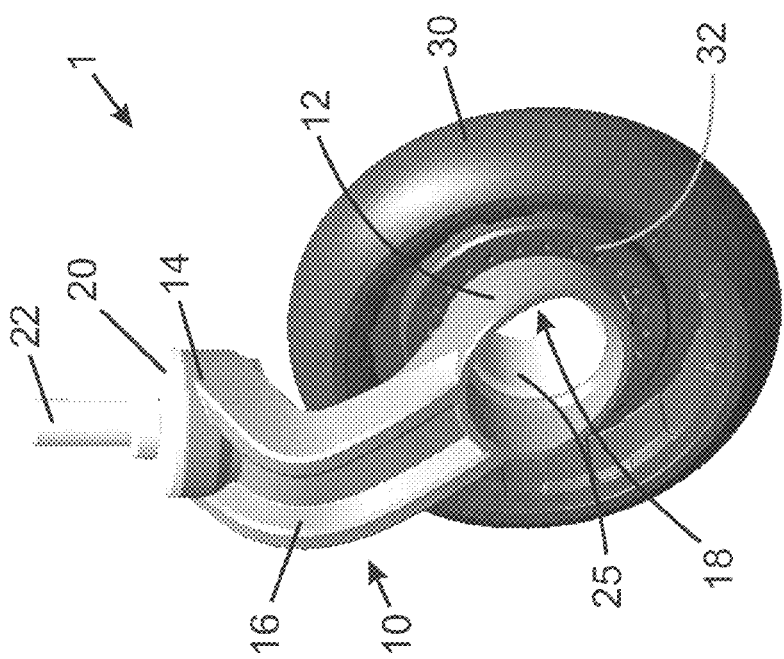
FIG. 1B is a schematic front side perspective view of the caster of FIG. 1A.

FIG. 1A, FIG. 1B, FIG. 2A and FIG. 2B show a caster 1 comprising a monolithic fork 10, the fork 10 comprising a hub 12 disposed vertically below a chair mount 14 and connected to the chair mount 14 by an arcuately-shaped leg 16. The hub 12 is substantially annular and comprises a large pass-through aperture 18, thereby reducing weight be permitting the use of less material in the construction of the fork 10. The chair mount 14 is provided with a pivot bearing 20 in which a pivot pin 22 is seated. The pivot bearing 20 permits swiveling of the caster 1 through an entire 360 degrees in both directions and permits continued swiveling through multiple rotations in the same direction. The arcuately-shaped leg 16 provides space between the hub 12 and the chair mount 14 for the wheel 30 to rotate.

As best seen in FIG. 2A and FIG. 2B, the wheel 30 comprises a tire 50 supported on a rim 32. The rim 32 is supported on a rotational bearing 40, the rotational bearing 40 being supported on a bearing support surface 15 of the hub 12. The rotational bearing is a general annular ring having a large diameter in order to fit over the hub 12. The rotational bearing 40 permits rotation of the rim 32 on the bearing support surface 15, thus permitting rotation of the wheel 30 on the hub 12. The rim 32 is a substantially annular ring also having a pass-through aperture. A substantially annular retaining nut 25 also having a pass-through aperture is provided to retain the rotational bearing 40 between the rim 32 and the hub 12. When the rim 32 and the retaining nut 25 are mounted on the hub 12, the pass-through apertures on all three are aligned providing a single large pass-through aperture for the entire caster. This gives the appearance that the caster is hub-less. The pass-through apertures emphasize the large diameter of the rotational bearing.

Still referring primarily to FIG. 2A and FIG. 2B, the rim 32 comprises a substantially annular bearing contact surface 35, which rests on the rotational bearing 40. The bearing contact surface 35 of the rim 32 and the bearing support surface 15 of the hub 12 provide radially outer and radially inner structures, respectively, which are in contact with the rotational bearing 40. To prevent movement of the rotational bearing 40 along the axis of rotation of the wheel 30 (shown at A in FIG. 2A), inside and outside stop structures are provided.

On the inside, a first inside bearing stop 17 is integrally molded in the hub 12 and a second inside bearing stop is provided by a blocking ring 36 attached to or integrally molded with the rim 32. The blocking ring 36 comprises a radially inwardly extending portion 37 that extends towards the hub 12 and almost abuts the hub 12. It should be noted that the abutment between the hub 12 and the radially inwardly extending portion 37 of the blocking ring 36 should have some tolerance as the blocking ring 36 is attached to the rim 32 which rotates in relation to the hub 12 which does not rotate. The blocking ring 36 serves to support the inner side of the rotational bearing 40. Additionally, the radially inwardly extending portion 37 extends substantially all of way to the hub 12 in order to inhibit debris from reaching the rotational bearing 40.

The caster 1 has certain features, however, that inhibit hair, threads and the like from migrating into the bearing 40. For example, with reference to FIG. 2C, it can be seen that a gap G of a selected width exists between a radially inner edge 41 of the radially inwardly extending portion 37 and the outer surface (shown at 43) of the hub 12. Additionally, it can be seen that the outer surface 43 of the hub 12 is generally cylindrical and extends generally horizontally (i.e. the rotation axis A of the wheel 30 is generally horizontal). Furthermore, the hub 12 has a selected diameter as explained below. All of these features cooperate to inhibit hair and threads from migrating to and entangling in the bearing 40.

By not rotating, the hub 12 is less likely to drag hair and thread about its circumference during operation of the caster 1 as compared to a rotating hub. By extending generally horizontally and having a generally cylindrical shape hair and thread that do reside on the hub 12 even temporarily is less likely to migrate towards the bearing than a hub whose diameter tapers down severely towards the bearing. By providing a gap G that is at least a selected width, such as, for example, about 0.015 inches, hair that does migrate into the gap is not pinched by the surfaces 41 and 43 and thus does not become trapped in the gap G, thereby increasing the potential for such hair to fall off the hub 12 during continued use of the caster 1.

With respect to the diameter of the hub 12, it has been found that the likelihood of hair or thread remaining on the hub 12 is dependent at least in part on whether the hair or thread wraps more than a threshold number of times around the hub 12. By selecting the diameter of the hub 12 hair and thread of a certain length is prevented from wrapping around it by more than the threshold number of times. For example, in an environment where the expected hair or thread length that would be found on the floor would be about 6 inches, and in a situation where it was desired to provide a hub diameter that prevented a hair or thread from wrapping around the entire circumference of the hub 12, then a hub diameter of greater than about 6/PI or 1.9 inches would be desired. In some situations it has been found that a thread or hair could have a length that is slightly greater than one circumference of the hub 12 without a significant increase in the likelihood of becoming entangled on itself and remaining on the hub 12. As a result, for example, the hub diameter may be a bit less than 1.9 inches while still effectively preventing hair or thread of 6 inches in length from being entangled thereon. It has been found that, in general, a hub diameter of at least about 1.8 inches works well in inhibiting hair and thread from remaining on the hub 12. In embodiments wherein the expected length of hair or thread that could become wrapped and entangled on the hub 12 is 9 inches, then the hub diameter is preferably greater than about 9/PI or 2.9". In general, the selected diameter of the hub 12 may be selected based on preventing a selected length of hair or thread from wrapping and entangling on the hub 12.

The radially inwardly extending portion 37 may be provided with through apertures 38 spaced circumferentially about the face of the radially inwardly extending portion 37 so as to provide water drainage, to prevent corrosion of the rotational bearing 40. The through apertures 38 should be large enough for water drainage but small enough and far enough away from the hub 12 so that debris is unlikely to pass through. It is preferable for support to be provided on the inside and outside for both the radially outer and radially inner races of the bearing 40 (shown at 40a and 40b in FIG. 2C). As can be seen in FIG. 2C the support is provided on the inside by the radially inwardly extending portion 37 and by the bearing stop 17. It is preferable, however, in at least some embodiments for the support to be provided by both the bearing stop 17 (e.g. for the lower race 40b) and the radially inwardly extending portion 37 (e.g. for the upper race 40a).

For example, the first inside bearing stop 17 prevents inward migration of the rotational bearing 40 during assembly of the caster 1. The blocking ring 36 also serves to prevent the rim 32 from sliding off the hub 12.

On the outside, a first outside bearing stop is provided by an outwardly extending head 26 of the retaining nut 25. When the retaining nut 25 is screwed into the pass-through aperture 18, the head 26 abuts the rotational bearing 40 thereby preventing the rotational bearing 40 from moving outward along the rotation axis of the wheel 30. In addition, the retaining nut 25 almost abuts a second outside bearing stop 39, the second outside bearing stop 39 being monolithic with the rim 32. The second outside bearing stop 39 also helps prevent the rotational bearing 40 from moving outward along the rotation axis of the wheel 30. Because the head 26 of the retaining nut 25 almost abuts the second outside bearing stop 39 and because the head 26 abuts the hub 12, the outside edge of the rotational bearing 40 is substantially entirely sealed against ingress of debris. It should be noted that the abutment between the head 26 of the retaining nut 25 and the second outside bearing stop 39 of the rim 32 should have some tolerance as the rim 32 rotates in relation to the retaining nut 25, the retaining nut 25 not rotating at all since the retaining nut 25 is secured to the hub 12 which does not rotate.

The retaining nut 25 may be externally threaded with screw threads 28 that mate with screw threads 13 on an inner surface of the hub 12 around pass-through aperture 18. The retaining nut 25 may be screwed into the pass-through aperture 18 by means of the mated threads 28, 13. It is evident that other means for securing to the nut to the hub may be used, and a variety of thread-less nuts is available for such a purpose.

The caster permits changing wheel size without the need to change the fork. A single size fork with a single size hub supporting a single size rotational bearing may be used to support different sized wheels. Thus, if a different sized wheel is desired, it may be changed without replacing the entire caster and may even be changed with the caster still on the chair. Wheel sizes of 4 inches and 5 inches are particularly desirable as they emphasize the hub-less appearance of the caster.

Figure 3:
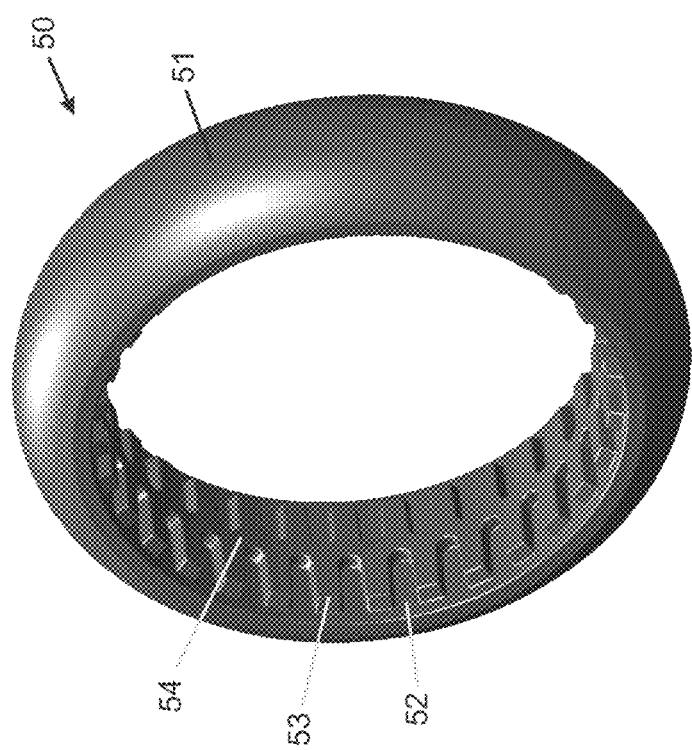

Referring to FIG. 3, the tire 50 is a solid tire made of a polymeric material and has resilience. For example a thermoplastic or an elastomer are suitable materials. Natural or synthetic rubbers are preferred. The tire 50 has an outer surface 51 and an inner surface 52. The inner surface 52 has a plurality of raised portions 53 molded therein. The plurality of raised portions 53 permits the tire 50 to be generally thinner in many places resulting in a tire that weighs less while retaining structural strength. The plurality of raised portions 53 form a contiguous raised region 54 about a circumference of the inner surface 52 and may optionally extend along a central plane of the tire 50. The contiguous raised region 54 helps maintain ride quality of the caster 1.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A caster comprising:
    (a) a monolithic fork comprising a substantially annular wheel-supporting portion and a chair-supporting portion, the wheel-supporting portion having a pass-through aperture;
    (b) a rotational bearing supported on the wheel-supporting portion of the fork;
    (c) a wheel comprising a load-supporting rim, the rim supported on the bearing such that the wheel rotates on the bearing in the vertical plane, the rim comprising a pass-through aperture aligned with the pass-through aperture of the fork, the rim further comprising a non-load bearing substantially annular ring at an inside edge of the bearing to retain the bearing between the rim and the fork and to inhibit debris from contacting the bearing; and,
    (d) a retainer configured to be received by the inner surface of the fork, the retainer comprising a pass-through aperture aligned with the pass-through aperture of the fork, the retainer further comprising a bearing-retaining portion at an outside edge of the bearing to retain the bearing between the rim and the fork and to inhibit debris from contacting the bearing.

2. A caster as claimed in claim 1, wherein the chair is a wheelchair.

3. A caster as claimed in claim 1, wherein a pivot bearing and a pivot pin in the pivot bearing are mounted on the chair-supporting portion of the fork, the pivot pin configured to be mounted on the chair.

4. A caster as claimed in claim 1, wherein the rotational bearing is a single rotational bearing aligned in the vertical plane so that the bearing rotates in the vertical plane.

5. A caster as claimed in claim 1, wherein the annular ring is welded to the rim.

6. A caster as claimed in claim 1, wherein the rim further comprises an outer bearing stop portion at the outside edge of the bearing to retain the bearing between the rim and the fork.

7. A caster as claimed in claim 1, wherein the annular ring is monolithic with the rim.

8. A caster as claimed in claim 1, wherein the wheel-supporting portion of the fork comprises an inner bearing stop portion at the inside edge of the bearing to retain the bearing between the rim and the fork.

9. A caster as claimed in claim 1, wherein the fork comprises an arcuately-shaped leg between the wheel-supporting portion and the chair-supporting portion to permit rotation of the wheel in the vertical plane.

10. A caster as claimed in claim 1, wherein the fork, rim, annular ring and retainer comprise a filled plastic material.

11. A caster as claimed in claim 1, further comprising a tire including an annular ring of polymeric material having an outer surface and an inner surface, the inner surface including a plurality of raised portions.

12. A caster as claimed in claim 11, wherein the plurality of raised portions form a contiguous raised region about a circumference of the inner surface.

13. A caster as claimed in claim 11, wherein the material includes an elastomer.

14. A caster as claimed in claim 11, wherein the material includes a rubber.

* * * * *